United States Patent [19]

Czichy

[11] Patent Number: 5,982,323

[45] Date of Patent: Nov. 9, 1999

[54] SATELLITE NAVIGATION SYSTEM

[75] Inventor: Reinhard Hanno Czichy, Eggersriet, Switzerland

[73] Assignee: Oerlikon Contraves AG, Zurich, Switzerland

[21] Appl. No.: 08/893,619

[22] Filed: Jul. 11, 1997

[30] Foreign Application Priority Data

May 24, 1997 [CH]  Switzerland ............................ 1210/97

[51] Int. Cl.⁶ ............................ G01S 5/02; H04B 7/185
[52] U.S. Cl. ............................ 342/357.01; 342/357.06; 342/357.16; 701/213
[58] Field of Search ........................ 342/352, 357; 455/12.1; 701/213

[56] References Cited

U.S. PATENT DOCUMENTS

| | | | |
|---|---|---|---|
| 5,184,139 | 2/1993 | Hirako et al. ............................ | 342/354 |
| 5,641,134 | 6/1997 | Vatt ............................ | 244/158 R |
| 5,812,086 | 9/1998 | Bertiger et al. ............................ | 342/357 |

FOREIGN PATENT DOCUMENTS

| | | |
|---|---|---|
| 0528090 | 2/1993 | European Pat. Off. . |
| 0601293 | 6/1994 | European Pat. Off. . |
| 9616489 | 5/1996 | WIPO . |

OTHER PUBLICATIONS

Dipl.–Ing. Lambert Wanninger, "Der Einfluss der Ionosphäre auf die Positionierung mit GPS", Wissenschaftliche Arbeiten Der Fachrichtung Vermessungswesen Der Universität Hanover, Nr. 201, pp. 28–30, 1994.

D. Giggenbach, "Optische Komunikation Im Weltraum", Funkschau, vol. 68, No. 2, pp. 68–70, Jan. 5, 1996.

M. Nohara et al., "A Link Study of a Low–Earth Orbit Satellite Communications System Using Optical Inter–satellite Links", IEICE Transactions on Communications, vol. E76–B, No. 5, May 5, 1993.

D. W. Dreisewerd et al., "A GEO to GEO High Data Rate Optical Crosslink Approach (U)", Communications pp. 184–187, Oct. 11, 1992.

Primary Examiner—Thomas H. Tarcza
Assistant Examiner—Dao L. Phan
Attorney, Agent, or Firm—Browdy and Neimark

[57] ABSTRACT

The instant invention relates to a method for establishing a satellite navigation system, using the satellite networks provided for mobile communications, below the geostationary orbit, in particular in LEO (low earth orbiting) or MEO (medium earth orbiting) constellations, as well as its connection to communications satellites in the geostationary orbit. The establishment of satellite navigation networks in accordance with the invention is made possible by means of the employment of special optical ISL (inter-satellite link) terminals with ranging functions in various LEO or MEO satellite networks, and possibly by including GEO satellite constellations.

27 Claims, 3 Drawing Sheets

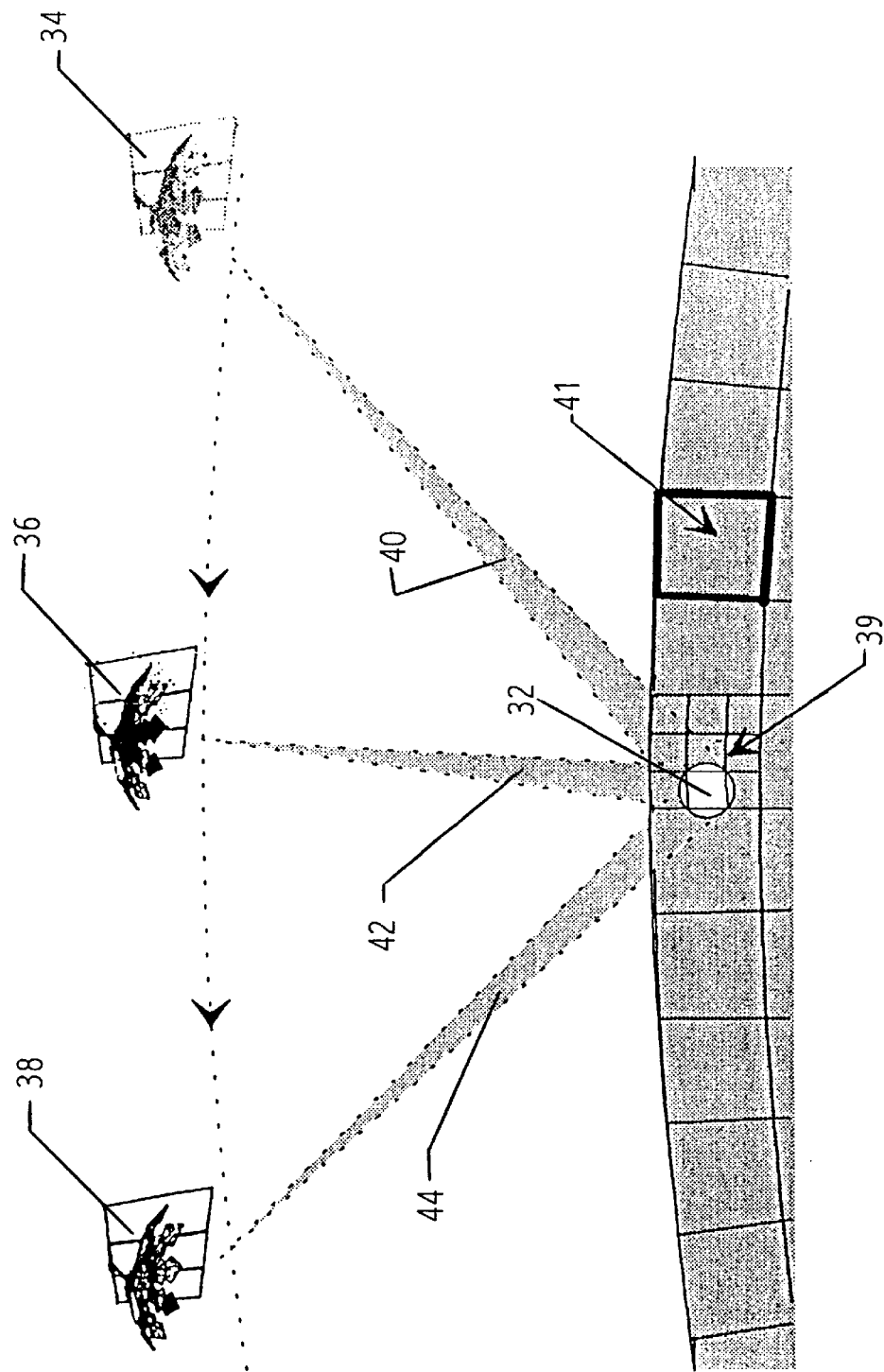

SATELLITE NAVIGATION SYSTEM

FIELD OF THE INVENTION

The instant invention relates to a method for establishing a satellite navigation system, using the satellite networks provided for mobile communications, below the geostationary orbit, in particular in LEO (low earth orbiting) or MEO (medium earth orbiting) constellations, as well as its connection to communications satellites in the geostationary orbit.

BACKGROUND OF THE INVENTION

Existing satellite navigation systems, such as GPS (Global Positioning System), GLONASS or planned European systems (GNSS) have been realized or are planned by means of special constellations of several satellites orbiting the earth on polar paths or on geostationary paths. The planned European system GNSS, for example, could be implemented by including the satellites of the INMARSAT network moving in geostationary orbits. The satellites of the GPS move in polar orbits at an attitude of approximately 20,000 km above ground and emit radio signals, depending on the user group, on one or two frequencies in the range between 1 and 2 GHz, which transmit exact time markers to the user on the ground by means of a permanently repeated modulation with a very broadband data sequence of great length. Because of the very broadband modulation signal and the relatively low rate of its repetition, the spectrum of these radio signals gives the impression of white noise in the close vicinity of its respective center frequency. Since the phase of the radio signal is modulated, it is possible to return it to its unmodulated state in the receiver by means of negative modulation with the same modulation signal, which can be very easily reproduced because of its particular structure, and can be detected with little noise by means of a very narrow band filter.

The synchronization of the second modulating process in the receiver required for this makes possible the determination of distance differences from several satellites which are to be received simultaneously, whose respective instantaneous positions are known, and from this, analogously with the hyperbolic navigation process, the exact determination of the position of the user.

By means of the operation on two different frequencies, a compensation of the properties of the ionosphere surrounding the earth, whose structure changes in the course of a sunspot cycle during a period of approximately eleven years, as well as seasonally and daily, is offered to an appropriately equipped group of users (Lambert Wanninger "Der Einfluss der Ionosphäre auf die Positionierung mit GPS" [The Effects of the Ionosphere on Positioning by Means of GPS], Hannover University, 1994, ISSN 0174-1454).

Furthermore, errors are deliberately generated by the operator (US Air Force) in order to prevent the use of commercially available receivers, for example for the rapid and easy placement of gun positions. As a result all remaining, parallel existing and planned systems with satellites in higher orbits have the main purpose of breaking the monopoly of a single system and to make available worldwide, highly exact position determinations independently of marginal political and military conditions.

The mentioned systems do not operate cooperatively, there is no bidirectional linkage between the satellites and the individual user of the systems, and therefore the number of users is infinite and, with the full operability of the system, also uncontrollable. The good viewing ability of the satellites, assured by the high orbits of the respective satellites, makes it possible to keep their number low for covering the entire surface of the earth. Twenty-one operating satellites are sufficient for GPS. However, it is hardly possible to selectively cancel the availability of the system in narrowly defined regions of the world in order to prevent their integration into the optimized operation of military systems. Furthermore, a hypothetical system operated by means of satellites in relatively high orbits with a cooperative position determination for the purpose of controlling unwanted usage, only allows a limited number of users, given the existing scarcity of frequencies.

OBJECT AND SUMMARY OF THE INVENTION

It is therefore the object of the system in accordance with the invention to avoid the disadvantages of the prior art and to support the radio position determination of users of LEO and or MEO communications systems.

In accordance with the invention, this object is attained several linked satellites communicating by means of optical information links which are utilized for navigation.

Thus, the basic concept of the invention is the inclusion of already known and existing communications links between satellites which, because of the limited visibility of the satellites of LEO (Low Earth Orbiting) or MEO (medium earth orbiting) satellite communications networks and neighboring networks are compellingly necessary. However, on the other hand the limited visibility permits the splitting of the portion of the earth's surface covered by the system into numerous small cells without elaborate antennas being required on board of the numerous satellites of the system. The free distance between the satellite and the user is comparatively short and permits the use of end devices with low radiation output. With a correspondingly close sequence of satellites in numerous low orbits, each user can come into simultaneous contact with several satellites and can, the same as with the GPS, determine his position wherein, in contrast to the latter system, fewer high-grade time normals on board of the satellite are needed, since they can be averaged via communication links between the satellites of the system. When employing optical communication links between the satellites it is possible, besides the exact distance determination, to also perform an exact determination of the direction of the satellites operating as the counter-station. The relative positions of the satellites in respect to each other known from this allow a more exact position determination of the user. Because of the known relative positions of the satellites connected with the users it is also possible to provide signals transmitted by them or characteristics extracted from them after their reception by several satellites to a central location, making use of the known delays, where the calculation of the position of the user then takes place. Furthermore, optical communication links with geostationary orbiting satellites can lead to an increase in the measurement base and thus to an increase in accuracy. It is also possible to utilize satellites orbiting at intermediate altitudes or geostationary for the establishment of a cooperatively or non-cooperatively operating navigation system by means of the method in accordance with the invention.

The advantage of all disclosed systems in accordance with the invention over the prior art results in the possibility of the mutual comparison of the time normals carried in the satellites, as well as the mutual determination of the position of all satellites included in the system in relation to each other, and therefore the more exact determination of the orbital data, from which an increased accuracy results for non-cooperative position determination methods.

A further advantage of the basic principle rests in the possibility of employing cooperative position determination methods. In this case a user of a satellite-supported mobile radio network has the advantage of being able to have his position determined, without having to have special devices for position determination, by means of delay time-supported processing of the signal transmitted by him, on board the satellites linked with each other, which have received his signal and collected it by means of optical communication links. One advantage of the satellite navigation systems, which consist of satellites positioned in low orbits, which is only made possible by the concept of the invention, rests in the potentially large number of users determining their positions cooperatively, as well as in the ability of locally limiting the use of non-cooperatively operating position determination methods.

Further details, characteristics and advantages of the invention ensue not only from the claims and the characteristics to be found therein, either individually or in combination, but also from the following description of a preferred embodiment.

BRIEF DESCRIPTION OF THE DRAWINGS

FIG. 4 shows the coverage of a user in a cell of a satellite communication network by several successive satellites of the network.

DETAILED DESCRIPTION OF THE PREFERRED EMBODIMENT

Figure 1:
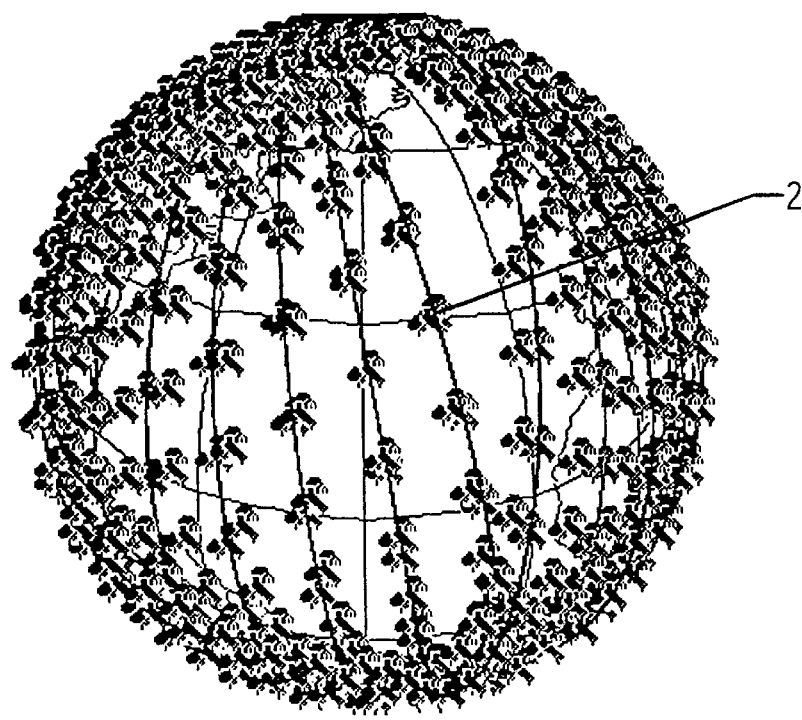
FIG. 1 represents the TELEDESIC network as an example of a low earth orbiting satellite network.
Figure 2:
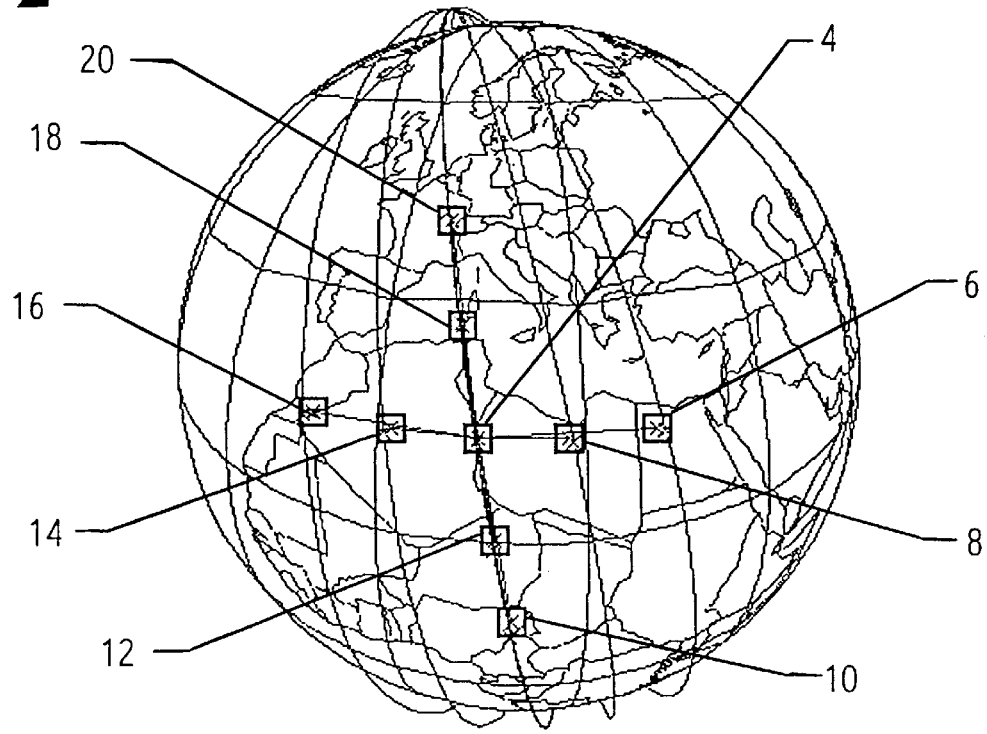
FIG. 2 is the representation of a group of the TELEDESIC network linked by direct optical connections.

FIG. 1 represents a possible satellite communications network (TELEDESIC project) consisting of 840 satellites 2, which circle the earth in numerous near-polar orbits. In this case the satellites are directly linked to a central satellite 4 in groups, represented in FIG. 2 and consisting of satellites 4 to 20, by means of optical communication links. The conveyance of information takes place over the entire network by forwarding it between network elements consisting of several satellites 4 to 20 represented in FIG. 2 by way of example.

Figure 3:
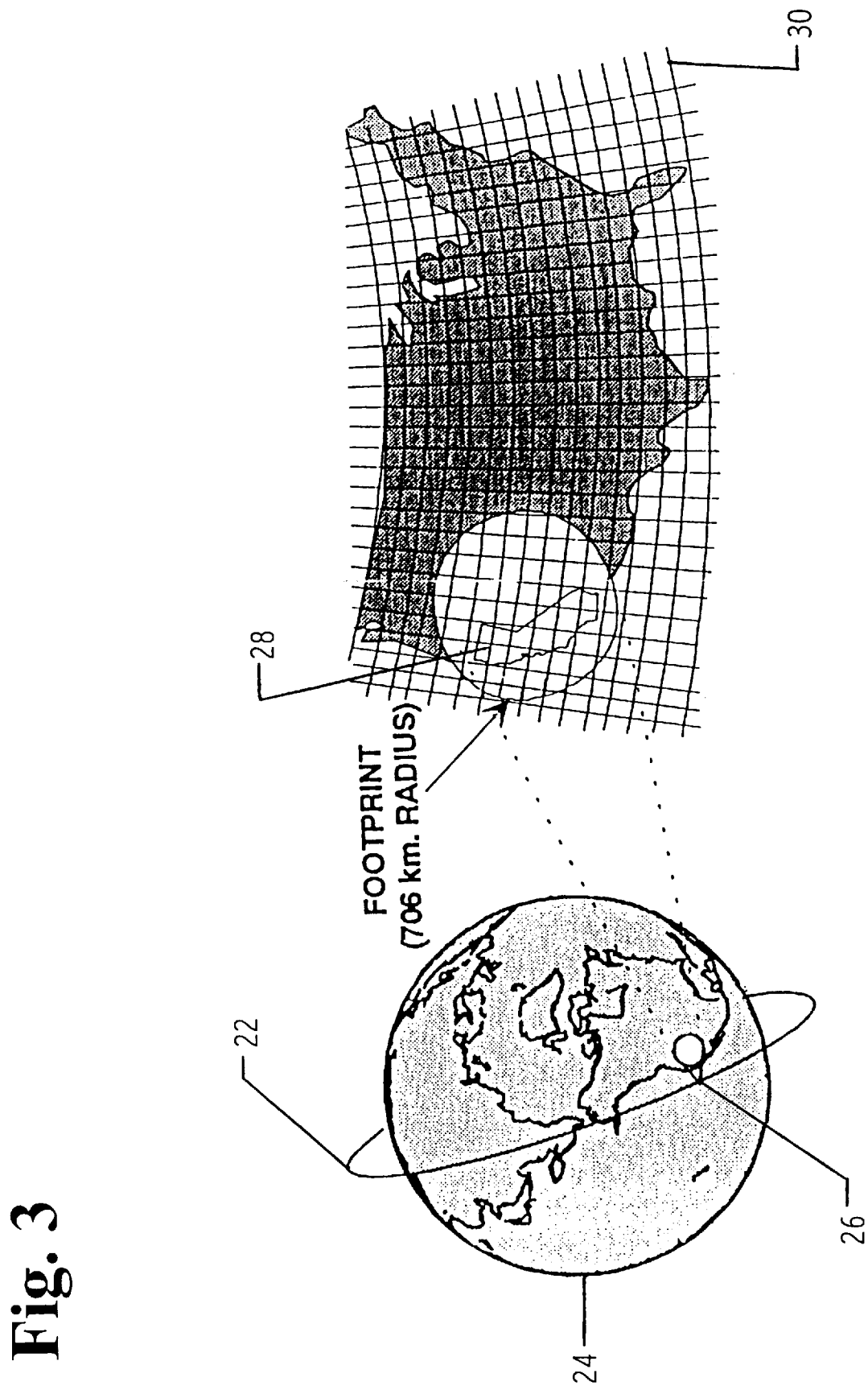
FIG. 3 shows the area of visibility of a satellite for the earthbound user.

An area 28 can be seen in two details in FIG. 3, in which a satellite 26 circling the earth 24 in an orbit 22 can be reached by an earthbound user. A grid 30 extends into the area 28 in the right part of FIG. 3 and makes it clear that a single satellite can reach several cells of the radio net. On the other hand, a user in such a cell can always see several satellites, each of which separately serves several cells of the network by means of directional antennas or special multiplexing processes. In general, the simultaneous contact with several satellites which is possible can be utilized for a navigation system.

FIG. 4 represents the simultaneous coverage of a user located in a cell 22 by the satellites 34, 36 and 38 moving successively in an orbit by means of differently oriented radiation 40, 42 and 44. However, it is also possible to simultaneously cover satellites moving in different orbits. Analogously with the non-cooperative position determination systems such as GPS and GLONASS, all satellites 34, 36 and 38 send signals with time markers to the user, which autonomously interprets respective location-dependent delay time differences. Conversely, a user of a cooperative method can have his signals, which arrive at different times in the satellites 34, 36 and 38, combined by means of optical communication links between the satellites 34, 36 and 38 in order to have location dependent differences in delay times analyzed by using the delay times between the satellites known from measurement. In this case no special devices are required by the user. A network which can be used for position determination can also consist of satellites located at intermediate altitudes above the earth, or partially of satellites circling in geostationary orbits. Furthermore, the satellites of the system can be supported by the non-cooperative use of an existing navigation system in order to support the cooperative position determination of the users.

What is claimed is:

1. A method for operating a satellite navigation system, the system including a satellite first network comprising global-positioning satellites emitting satellite localization signals;

a satellite second network comprising a constellation of mobile-communication satellites including optical links for communication within the second network;

the method comprising:

determining a position of at least one of the mobile-communication satellites within the satellite second network using the localization signals emitted by said first network;

using time-delay measurements of the optical links for determining relative positions of the mobile-communication satellites within the second network; and providing ground-position signals, from selected ones of the mobile-communication satellites, to selected geographical-area cells on the ground;

whereby no ground-position signals are available outside the selected geographical-area cells.

2. The method according to claim 1, including a step of determining precise relative positions of the satellites by alignment of optical links for communication within the second network.

3. The method according to claim 1, including a step of calibrating time standards carried on board the satellites of the second network by optical communication between the satellites.

4. The method according to claim 1, including steps of receiving signals, transmitted from a ground location in one of the selected geographical-area cells, at a plurality of satellites of the second network, and using cooperative position-determination methods to determine the ground location.

5. The method according to claim 4, comprising a step of including time marks in the signals transmitted from the ground location.

6. The method according to claim 1, including a step of determining positions of satellites of the second network by optical communication with a geosynchronous satellite.

7. The method according to claim 6, including a step of using an existing navigation system for cooperatively or non-cooperatively determining the positions of the satellites of the second network.

8. The method according to claim 1, including a step of using time and frequency standards of an existing navigation system for cooperatively or non-cooperatively determining a ground location.

9. The method according to claim 1, including steps of measuring Doppler frequency shifts in calibrated signals of passing satellites over one of the selected geographical-area cells in various different orbits, and using non-cooperative position-determination methods to locate a ground location.

10. A method for operating a satellite navigation system, the system including a ground first network emitting satellite localization signals;

a satellite second network comprising a constellation of mobile-communication satellites including optical links for communication within the second network;

the method comprising:

determining a position of at least one of the mobile-communication satellites within the satellite second network using the localization signals emitted by said first network;

using time-delay measurements of the optical links for determining relative positions of the mobile-communication satellites within the second network; and providing ground-position signals, from selected ones of the mobile-communication satellites, to selected geographical-area cells on the ground;

whereby no ground-position signals are available outside the selected geographical-area cells.

11. The method according to claim 10, including a step of determining precise relative positions of the satellites by alignment of optical links for communication within the second network.

12. The method according to claim 10, including a step of calibrating time standards carried on board the satellites of the second network by optical communication between the satellites.

13. The method according to claim 10, including steps of receiving signals, transmitted from a ground location in one of the selected geographical-area cells, at a plurality of satellites of the second network, and using cooperative position-determination methods to determine the ground location.

14. The method according to claim 13, comprising a step of including time marks in the signals transmitted from the ground location.

15. The method according to claim 10, including a step of determining positions of satellites of the second network by optical communication with a geosynchronous satellite.

16. The method according to claim 15, including a step of using an existing navigation system for cooperatively or non-cooperatively determining the positions of the satellites of the second network.

17. The method according to claim 10, including a step of using time and frequency standards of an existing navigation system for cooperatively or non-cooperatively determining a ground location.

18. The method according to claim 10, including steps of measuring Doppler frequency shifts in calibrated signals of passing satellites over one of the selected geographical-area cells in various different orbits, and using non-cooperative position-determination methods to locate a ground location.

19. A method for operating a satellite navigation system, the system including a satellite first network comprising satellites orbiting in geosynchronous orbits and emitting satellite localization signals;

a satellite second network comprising a constellation of mobile-communication satellites including optical links for communication within the second network;

the method comprising:

determining a position of at least one of the mobile-communication satellites within the satellite second network using the localization signals emitted by said first network;

using time-delay measurements of the optical links for determining relative positions of the mobile-communication satellites within the second network; and providing ground-position signals, from selected ones of the mobile-communication satellites, to selected geographical-area cells on the ground;

whereby no ground-position signals are available outside the selected geographical-area cells.

20. The method according to claim 19, including a step of determining precise relative positions of the satellites by alignment of optical links for communication within the second network.

21. The method according to claim 19, including a step of calibrating time standards carried on board the satellites of the second network by optical communication between the satellites.

22. The method according to claim 19, including steps of receiving signals, transmitted from a ground location in one of the selected geographical-area cells, at a plurality of satellites of the second network, and using cooperative position-determination methods to determine the ground location.

23. The method according to claim 22, comprising a step of including time marks in the signals transmitted from the ground location.

24. The method according to claim 19, including a step of determining positions of satellites of the second network by optical communication with a geosynchronous satellite.

25. The method according to claim 24, including a step of using an existing navigation system for cooperatively or non-cooperatively determining the positions of the satellites of the second network.

26. The method according to claim 19, including a step of using time and frequency standards of an existing navigation system for cooperatively or non-cooperatively determining a ground location.

27. The method according to claim 19, including steps of measuring Doppler frequency shifts in calibrated signals of passing satellites over one of the selected geographical-area cells in various different orbits, and using non-cooperative position-determination methods to locate a ground location.

* * * * *